(12) United States Patent
Joyce et al.

(10) Patent No.: US 8,347,219 B1
(45) Date of Patent: Jan. 1, 2013

(54) OBJECT-LEVEL DISPLAY BUILDING

(75) Inventors: Scott E. Joyce, Foxboro, MA (US);
Munish Desai, Shrewsbury, MA (US);
Anirudh Takkallapally, Natick, MA
(US); Peter Chen, Charlton, MA (US)

(73) Assignee: EMC Corporation, Hopkinton, MA (US)

( * ) Notice: Subject to any disclaimer, the term of this patent is extended or adjusted under 35 U.S.C. 154(b) by 357 days.

(21) Appl. No.: 12/751,010

(22) Filed: Mar. 31, 2010

(51) Int. Cl.
*G06F 3/048* (2006.01)
*G06F 3/00* (2006.01)
*G06F 17/00* (2006.01)
*G06F 15/173* (2006.01)

(52) U.S. Cl. ......... 715/762; 715/763; 715/738; 709/223

(58) Field of Classification Search .................. 715/762, 715/763, 738; 709/223
See application file for complete search history.

(56) References Cited

U.S. PATENT DOCUMENTS

| | | | | | |
|---|---|---|---|---|---|
| 6,009,466 | A | * | 12/1999 | Axberg et al. | ................ 709/220 |
| 6,073,163 | A | * | 6/2000 | Clark et al. | ................... 709/203 |
| 6,085,156 | A | * | 7/2000 | Rust et al. | ........................ 702/91 |
| 6,448,981 | B1 | * | 9/2002 | Kaczmarski | ................. 715/763 |
| 8,146,006 | B2 | * | 3/2012 | Bauman et al. | ............... 715/762 |
| 2002/0002606 | A1 | * | 1/2002 | Jaffe | .............................. 709/223 |
| 2003/0043192 | A1 | * | 3/2003 | Bouleau | ........................ 345/762 |
| 2003/0093509 | A1 | * | 5/2003 | Li et al. | .......................... 709/223 |
| 2003/0115306 | A1 | * | 6/2003 | Hagarty et al. | ................ 709/223 |
| 2005/0015472 | A1 | * | 1/2005 | Catania et al. | ................. 709/223 |
| 2006/0015847 | A1 | * | 1/2006 | Carroll, Jr. | ..................... 717/109 |
| 2008/0281911 | A1 | * | 11/2008 | Comeau et al. | ............... 709/203 |

OTHER PUBLICATIONS

Deitel et al.; JAVA How to program; Dec. 27, 2006; Prentice Hall, Chapter 10.*
Reselman, Bob; Working with the Display Object and the Displayable Interface; Apr. 16, 2004; http://www.informit.com/articles/article.aspx?p=170724&seqNum=5.*
Skotiniotis, Therapon; JAVA Interfaces; May 12, 2006; http://www.ccs.neu.edu/home/skotthe/classes/csg100/f04/notes/lecture5.pdf.*
"CQL: Contextual Query Language (SRU Version 1.2 Specifications)." Aug. 22, 2008. http://www.loc.gov/standards/sru/specs/cql.html, visited on Jun. 8, 2009.

* cited by examiner

*Primary Examiner* — Jordany Nunez
(74) *Attorney, Agent, or Firm* — BainwoodHuang

(57) ABSTRACT

One embodiment is directed to a method for building an object for display by a client device. The method includes transmitting, by a client device, a request to an object storage device for a class of objects. The method includes receiving, by the client device, a list of objects of the class of objects requested, the list of objects including an interface attribute, the interface attribute configured to direct the client device to a set of display properties for each object of the list of objects. The method also includes executing, by the client device, the interface attribute to retrieve the set of display properties associated with the display of each object of the class of objects, the set of display properties of each object defining a visual representation of that object by the client device.

17 Claims, 5 Drawing Sheets

OBJECT-LEVEL DISPLAY BUILDING

BACKGROUND

Certain conventional data storage systems use the Common Information Model (CIM) to represent elements of a data storage system (e.g., disks, LUNs, RAID groups, subsystems, etc.). These data storage systems are managed remotely by a conventional client application running on a client computer device across a network. In order for the client device to obtain information regarding certain aspects of the data storage system, the client device issues a request for certain CIM objects maintained by the data storage system (i.e., CIM objects of a particular type).

SUMMARY

Conventional client devices suffer from a variety of deficiencies. In conventional data storage systems, a client device can display objects in several different ways. For example, the client device can display each of the objects as a particular component (e.g., as a button, a link, or a table) of a class of objects, thereby allowing an end user to interact with a data storage system element (e.g., disk, logical unit number or LUN, host, etc.) represented by the corresponding displayed objects. However, regardless of class, in order to display each object the client device must undertake a procedure to retrieve display information, such as name information, text information, and icon information associated with each object. For example, because the display information may not be stored at the object level, a control associated with the client device (e.g., a Model View Controller (MVC)) must first retrieve the display information, such as via an object converter, in order for the client device to display the objects as components such as buttons, links, or tables.

During operation, assume the client device has sent a request to the data storage system to retrieve all disk objects. For each disk object returned, the object converter extracts specific call information (e.g., "get name," "get icon," "get tooltip," calls) included as part of the object and passes the call information to the client device control. The specific call information for each object provides the client device control with the ability to retrieve name, icon, and tooltip information, for example, to the object itself. Accordingly, when the control executes the call information, the control retrieves the information, such as name, icon, and tooltip, and uses the information to display the object as part of a particular display component (e.g., as a button, a link, or a table). However, for each display criteria, depending on how the client device is configured to display a given object, the object converter must individually extract the call information for each type of data storage system element, whether a disk, a host, or a LUN. Such a procedure is time consuming. Additionally, in conventional client devices, the object converter and client device control are configured as separate applications, thereby requiring the preparation and debugging of a relatively large amount of code related to object processing.

By contrast to the above-described approaches, embodiments of the present invention utilize an interface attribute associated with an object or with an object class. By including an interface attribute when defining an object class, object developers can genericize an object class to provide a client device the ability to display different features of the associated objects without requiring modification of the objects or a control associated with the client device. Effectively, use of the interface attribute allows the client device to work with different objects types in the same way since the interface attribute provides a level of commonality among the objects. This concept complements the common MVC design. Accordingly, with a genericized object, the client device can create the object and apply different MVC controls for display of the object without requiring the generation or use of a custom bridge layer, such as an object converter. Use of the genericized object can reduce the amount of code required to be developed for object processing and can reduce the associated development costs, as well One embodiment is directed to a method for building an object for display by a client device. The method includes transmitting, by a client device, a request to an object storage device for a class of objects. The method includes receiving, by the client device, a list of objects of the class of objects requested, the list of objects including an interface attribute, the interface attribute configured to direct the client device to a set of display properties for each object of the list of objects. The method also includes executing, by the client device, the interface attribute to retrieve the set of display properties associated with the display of each object of the class of objects, the set of display properties of each object defining a visual representation of that object by the client device.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
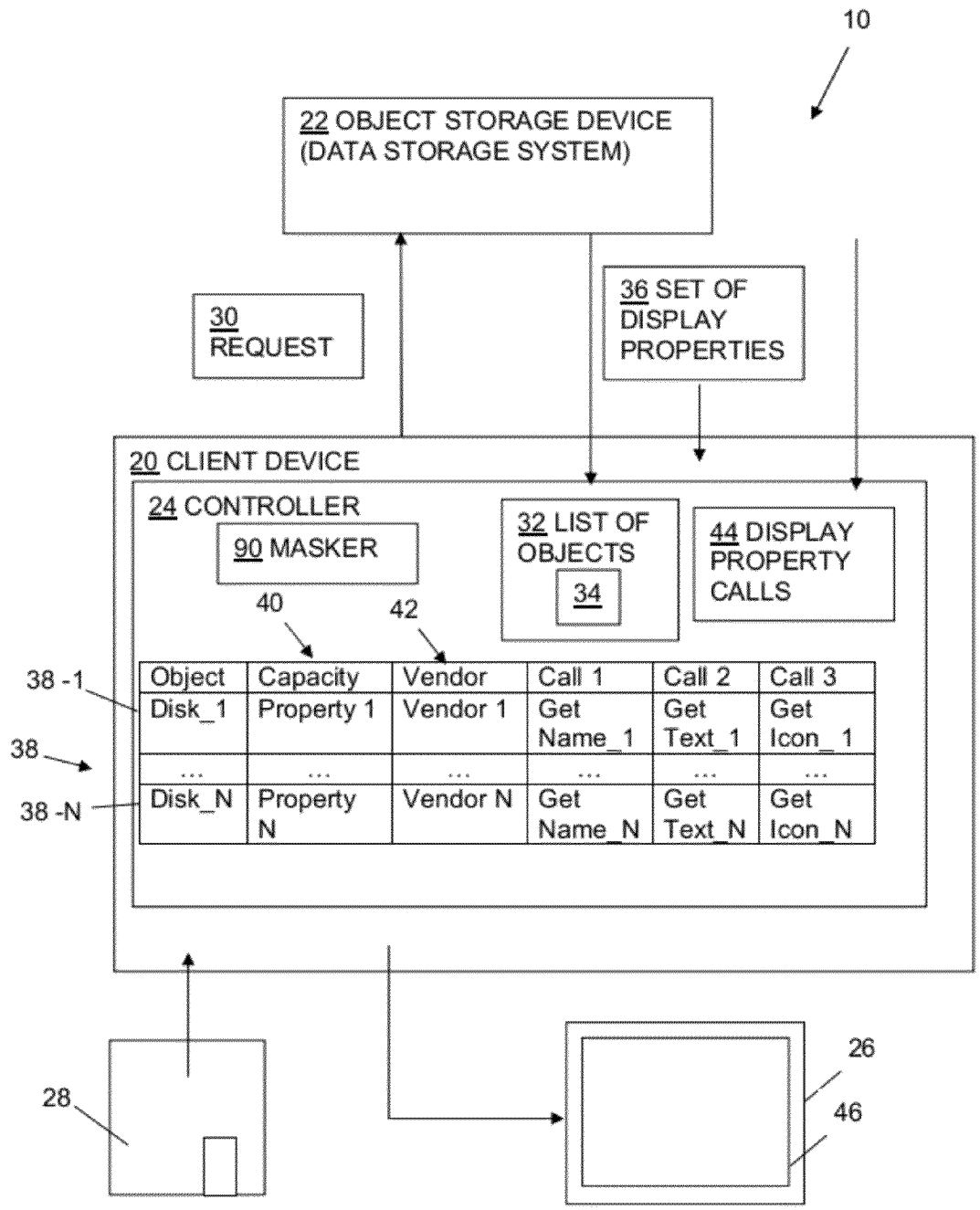
FIG. 1 illustrates a schematic representation of a client device, according to one embodiment.

Embodiments of the present invention utilize an interface attribute associated with an object or with an object class. By including an interface attribute when defining an object class, object developers can genericize an object class to provide a client device the ability to display different features of the associated objects without requiring modification of the objects or a control associated with the client device. Effectively, use of the interface attribute allows the client device to work with different objects types in the same way since the interface attribute provides a level of commonality among the objects. This concept complements the common MVC design. Accordingly, with a genericized object, the client device can create the object and apply different MVC controls for display of the object without requiring the generation or use of a custom bridge layer, such as an object converter. Use of the genericized object can reduce the amount of code required to be developed for object processing and can reduce the associated development costs, as well FIG. 1 illustrates an example arrangement of a data storage environment 10, such as used by an enterprise. As shown, the data storage environment 10 includes a client device 20 disposed in electrical communication with an object storage device 22, such as via a network connection.

In one arrangement, the object storage device is configured as a data storage system 22 having a set of disk enclosures where each of the disk enclosures includes an array of magnetic memory units or disk drives. The data storage system 22 also includes one or more storage processors configured to perform load and store operations on the disk drives on behalf of the client device 20.

The data storage system 22 is configured to store a plurality of objects (e.g., one or more objects) where an object is a representation of a logical or a physical location of data in the data storage system 22. Any object in the data storage system 24 may be categorized into a CIM class which relates to the type of element that any given object represents. CIM classes of objects can include subsystem, host, folder, logical unit number (LUN), disks, fans, link control cards (LCCs), power supply, storage processor, RAID group, and storage group classes, for example.

The data storage system 22 stores the object classes in a generic or genericized format to allow a single control associated with the client device 20 the ability to build and display objects without the use of a custom bridge layer. In one arrangement, when defining a class of objects, a user includes an interface attribute with the object class definition in order to genericize the object class. For example, within a framework, the user can define an object class for all disks associated with the data storage system as "class disk implements Displayable" where Displayable is the interface attribute which is associated with particular methods or calls (e.g., get name, get icon, get tooltip) utilized by the client device to build an object.

The client device 20, such as a computerized device, includes a controller 24, such as a memory and a processor. The controller 24 of the client device 20 is configured to build objects for display by a display device 26 disposed in electrical communication with the client device 20. For example, the controller 24 of the client device 20 is configured with a framework application and builds objects within the framework application, as will be described below.

In one arrangement, the controller 24 of the client device 20 stores an object building application. The object search application installs on the client device 20 from a computer program product 28. In some arrangements, the computer program product 28 is available in a standard off-the-shelf form such as a shrink wrap package (e.g., CD-ROMs, diskettes, tapes, etc.). In other arrangements, the computer program product 28 is available in a different form, such downloadable online media. When performed on the controller 24 of the client device 20, the object building application causes the client device 20 to receive generic object classes from the data storage system 22 and build objects for display by the display device 26.

Figure 2:
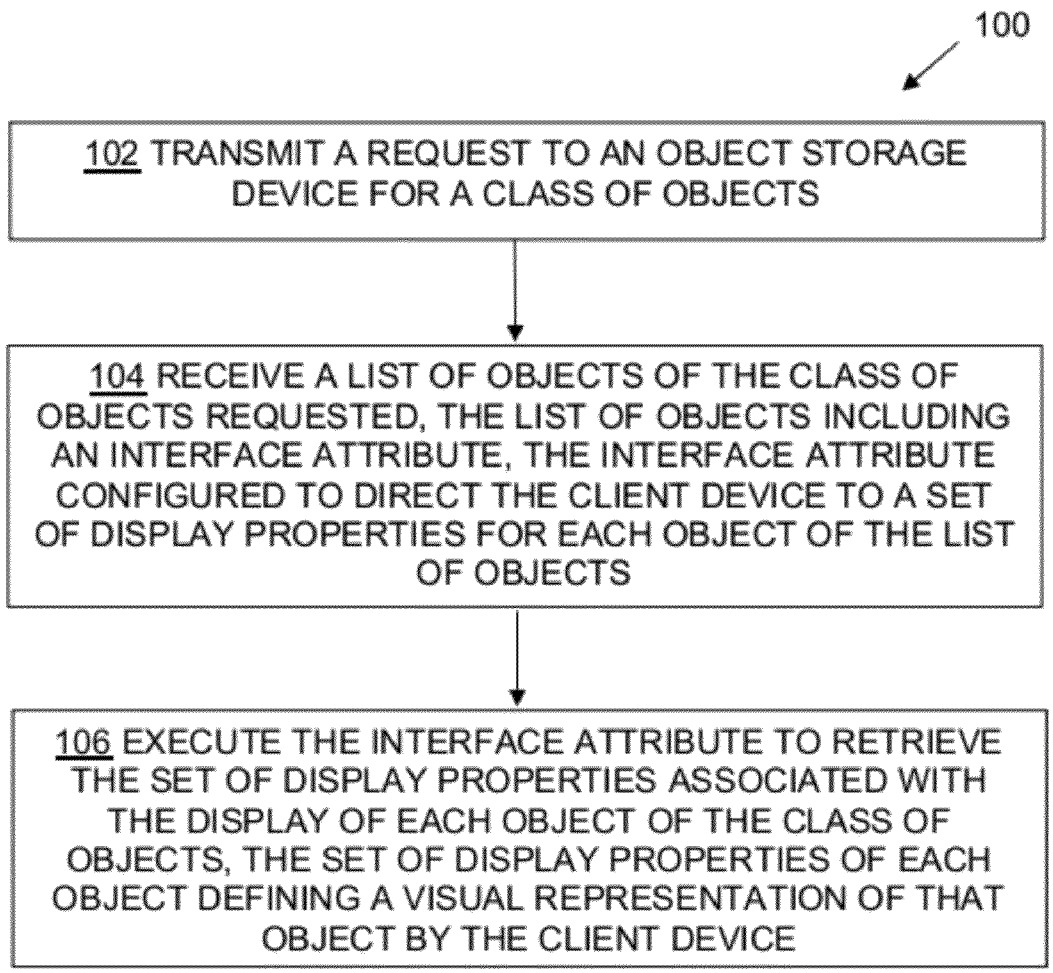
FIG. 2 is a flowchart that illustrates a procedure performed by the client device of FIG. 1.

FIG. 2 illustrates a method 100 performed by the client device 20 when building an object for display.

In step 102 the client device 20 transmits a request 30 to an object storage device 22 for a class of objects. For example, with reference to FIG. 1, assume a user wants to retrieve information regarding one or more classes of objects, such as all disk objects, associated with the data storage system 22. The user causes the client device 20 to transmit the request 30 for the class of objects (i.e., all disks) to the data storage system 22 in order to retrieve the class of disk objects.

Returning to FIG. 2, in step 104, the client device receives a list of objects 32 of the class of objects requested, the list of objects 32 including an interface attribute 34, the interface attribute 34 configured to direct the client device to a set of display properties for each object of the list of objects 32. As indicated above, each class definition for each class of objects includes an interface attribute 34. The interface attribute 34 is configured to genericize the class of objects and direct the client device to retrieve particular display properties used by the client device to build objects for display. For example, and with reference to FIG. 1, in response to the request 30 for a class of disk objects, the client device 20 receives a list of disk objects 32 associated with the data storage environment 10 from the data storage system 22. The list of objects 32 includes the interface attribute 34 (e.g., Displayable) used by the client device 20 to retrieve display properties (e.g., name, text, and icon information) for the listed objects, as will be described below. While the client device 20 can receive the list of objects 32 in a variety of formats, in one arrangement, the client device 20 received the list of objects 32 in tabular format, such as in an Extensible Markup Language (XML) format.

Returning to FIG. 2, in step 106, the client device 20 executes the interface attribute 34 to retrieve the set of display properties 36 associated with the display of each object of the class of objects, the set of display properties 36 of each object defining a visual representation of that object by the client device 20. While the client device 20 can retrieve of the set of display properties in a variety of ways, in one arrangement, the client device 20 retrieves the display properties 36 as follows.

With reference to FIG. 1, when the controller 24 of the client device 20 receives the list of objects 32 in an XML format, prior to executing the interface attribute 34, the controller 24 parses the list of objects 32 to create a set of instances 38 (i.e., instantiating) of a CIM class. For example, based upon the list of disk objects 32 received, the controller 24 creates instances Disk_1 38-1 through Disk_N 38-N of the disk object class. Additionally, based upon the parsing of the list of disc objects 32, the controller 24 includes properties associated with each disk object for each instance 38-1 through 38-N. For example, for the list of disk objects 32 received, the controller 24 can include a capacity property 40 and a vendor property 42 as part of each disk object instance 38-1 through 38-N.

Next, based upon the interface attribute 34, the controller 24 retrieves a set of display property calls 44 for each instance 38 of the set of instances 38-1 through 38-N. In one arrangement the interface attribute 34 points or directs the controller 24 to particular methods or properties associated with each object of each instance. For example, assume the case where the interface attribute 34 is configured as Displayable. In such a configuration, and as described above, Displayable is associated with particular methods or calls, such as a get name call, a get icon call, and a get tooltip call. When the controller 24 executes the Displayable interface attribute 34, the Displayable interface attribute 34 directs the controller 24 to retrieve the get name call, the get icon call, and the get tooltip call from a storage location. For example, with continued reference to FIG. 1, the Displayable interface attribute 34 can direct the controller 24 to retrieve the get name call, the get icon call, and the get tooltip call for the set of disk object instances 38 from the data storage system 22.

After the controller 24 has received the set of display property calls 44, the controller 24 associates the set of display property calls 44 with each corresponding instance of the set of instances 38 of the class of objects. For example, as illustrated, for a first disk object, the controller 24 associates the call Get Name_1, the call Get Text_1, and the call Get Icon_1 with the instance of Disk_1 38-1 and associated the call Get Name_N, the call Get Text_N, and the call Get Icon_N with the instance of Disk_N 38-N.

At the time that the client device 20 is required to display the objects of one or more classes of objects, the controller 24 executes the set of display property calls 44 for each instance of the set of instances 38 of the classes of objects. For example, with respect to the instance of Disk_1 38-1 of the disk object instances 38, the controller 24 executes the call Get Name_1, the call Get Text_1, and the call Get Icon_1. As a result of the execution the controller 24 receives, such as from the data storage device 22, the set of the display properties 36 associated with the instance each instance of Disk_1 38-1. While the set of display properties 36 can be configured in a variety of ways, in one arrangement, the set of display properties 36 includes a localized name of an object, a localized text of an object, an icon of an object, and a tooltip of an object. The controller device 24 repeats this process for each instance of the set of instances 38 of the disk objects.

Based on the received display properties 36 associated with each instance 38-1, 38-N of the set of instances 38, the client device 20 then generates a visual representation of each object associated with each instance 38-1, 38-N. For example, the controller 24 is configured to utilize the display properties 36 to build a visual representation of an object as a component such as a link, a table, or a button. Accordingly, based upon the display properties 36 (e.g., localized name of a disk object, localized text of a disk object, icon of a disk object, and tooltip of a disk object), the controller 24 is configured to build the object as a component such as a link, table, or button (e.g., the component interacts with the display properties 36 to form the displayable object)

Figure 3:
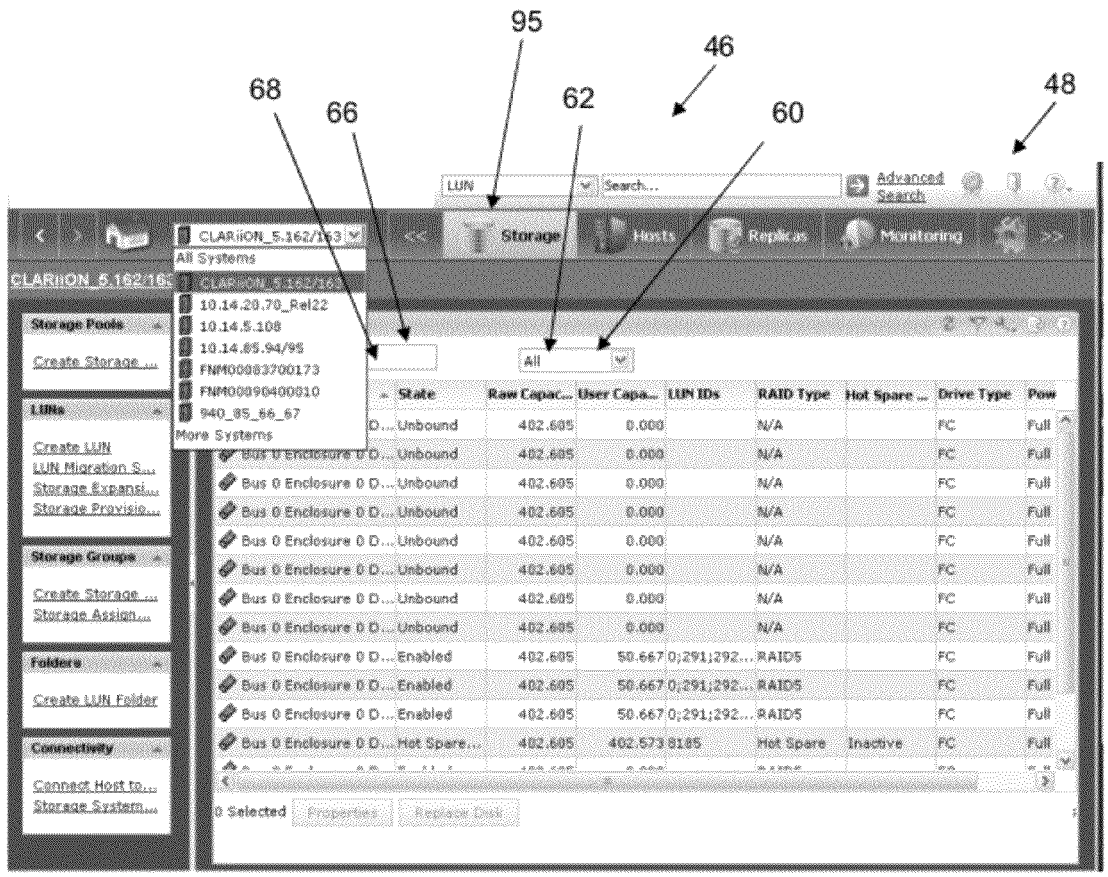
FIG. 3 is a graphical user interface provided by the client device as a result of performing the procedure of FIG. 1.

After having built the visual representation of each object for the class of objects, the client device 20 displays the component associated with the visual representations of the class of objects via the display 26. For example, with reference to FIGS. 1 and 3, once the controller 24 has built a set of the visual representations of a class of disk objects, the client device 20 provides, to the display 26, the component associated with the visual representations of the class of disk objects as a graphical user interface 46. With reference to FIG. 3, the client device 20 has provided a visual display of a set of disk objects in a table format 48 where each table cell 50 is an object of the class of disk objects.

By including an interface attribute 34 as part of a definition of a class of objects, the client device 20 can apply a set of associated display properties 36 to the genericized class of objects in a generic fashion. Accordingly, the computerized device can apply the same object to different MVC controls for display in a localized fashion (i.e., with text, tooltip, icons) without requiring the use of transformation code (e.g., an object converter) and without changing or generating a custom object.

Figure 4:
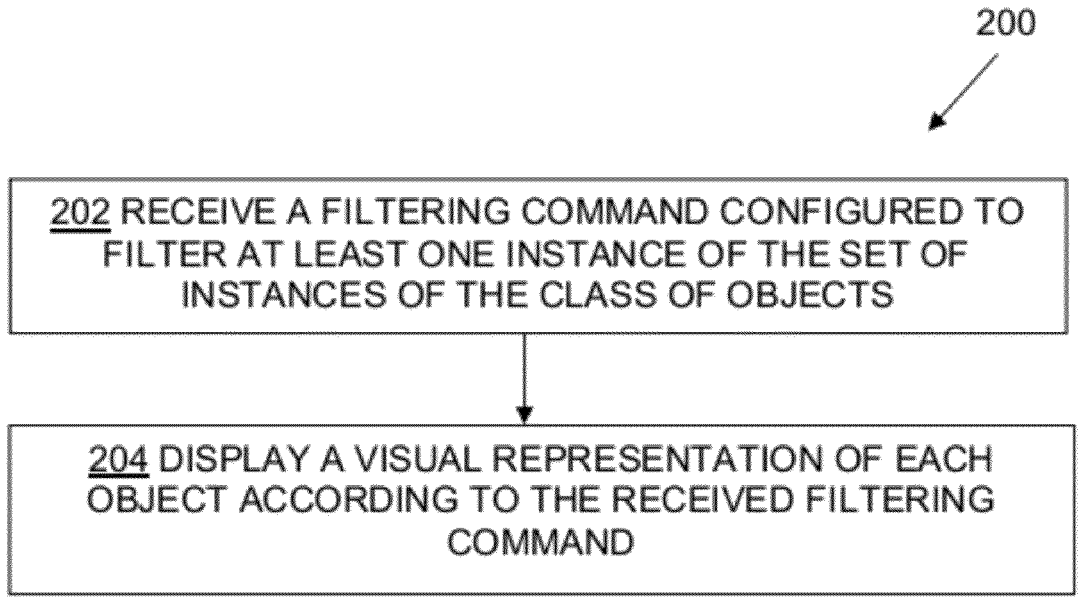
FIG. 4 is a flowchart that illustrates a procedure performed by the client device of FIG. 1

In one arrangement, the client device 20 is configured to perform operations on the instantiated list of object classes based upon operator input. FIG. 4 illustrates a method 200 performed by the client device 20 in response to receiving an operator input to filter the instances 38 of a class of objects.

In step 202, the client device receives a filtering command configured to filter at least one instance of the set of instances of the class of objects. In one arrangement, with reference to FIG. 3, the graphical user interface 46 provides a menu 60 that allows a user to provide the client device 20 with a filtering command 62. For example, the graphical user interface 46 allows the user to provide a filtering command 62 that causes the client device 20 to filter the instances 38 of a class of objects based upon display properties (e.g., name, text, and icon information) associated with an interface attribute 34 (e.g., Displayable). In response to receiving the filtering command 62, the client device 20 increments through the set of instances 38 of a class of objects and removes particular instances from the set 38 which correspond to the filtering command 62. For example, assume that the filtering command 62 instructs the client device 20 to remove instances of disks having a Name_1 as associated with the Get Name_1 call. With reference to FIG. 1, as the client device 20 increments through the set of instances 38, the client device 20 removes all instances having a call of Get Name_1, such as instance 38-1.

After having filtered the set of instances 38 for a set of objects, such as the set of disk objects, the client device 20 generates a visual representation of the filtered set of objects, such as described above. Returning to FIG. 5, as a result, in step 204 the client device 20 displays a visual representation of each object according to the received filtering command 62. For example, the client device 20 can display a graphical user interface 46 which lists disk objects for a class of disk objects and which excludes disks having a Name_1 as associated with the Get Name_1 call.

Figure 5:
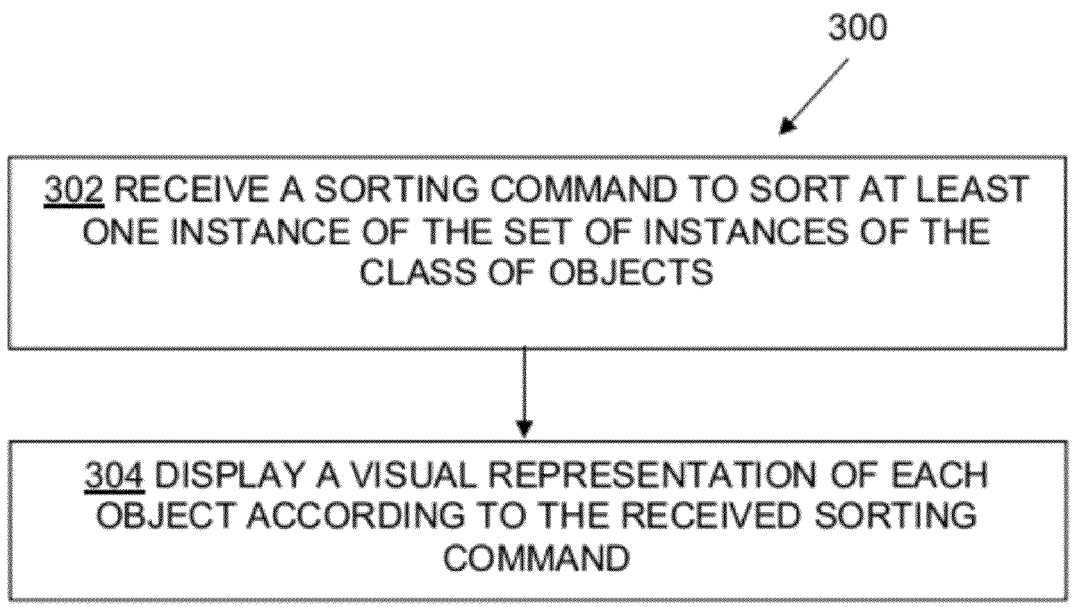
FIG. 5 is a flowchart that illustrates a procedure performed by the client device of FIG. 1.

FIG. 5 illustrates another method performed by the client device 20 where the client device 20 is configured to perform operations on the instantiated list of object classes based upon operator input. For example, FIG. 5 illustrates a method 300 performed by the client device 20 in response to receiving an operator input to sort the instances of a class of objects.

In step 302, the client device 20 receives a sorting command to sort at least one instance of the set of instances 38 of the class of objects. In one arrangement, with reference to FIG. 3, the graphical user interface 46 provides a command entry portion 66 that allows a user to enter a sorting command 68 to cause the computerized device to sort the set of instances 38 based upon display properties (e.g., name, text, and icon information) associated with an interface attribute 34 (e.g., Displayable). For example, assume the case where a user enters "localized name" as the sorting command 68. With reference to FIG. 1, in response to receiving the sorting command 68, the client device 20 increments through the set of instances 38 of the class of disk objects and arranges the instances according to a Name, as associated with the Get Name, call (e.g., ascending alphabetically).

After having sorted the set of instances 38 for a set of objects, such as the set of disk objects, the client device 20 generates a visual representation of the sorted set of objects, such as described above. Returning to FIG. 5, as a result, in step 304, the client device 20 displays a visual representation of each object according to the received sorting command 68. For example, the client device 20 can display a graphical user interface 46 which lists disk objects for a class of disk objects arranged in an ascending alphabetical order.

As indicated above, when the controller 24 of the client device executes the Displayable interface attribute 34, the Displayable interface attribute 34 directs the controller 24 to retrieve the Get Name call, the Get Icon call, and the Get Tooltip call from a storage location. In certain cases, however, it may not be desirable for the client device 20 to display one or more of the display properties 36 associated with the interface attribute 34. Accordingly, the client device 20 can be configured to limit the display of certain display properties 36 of an object.

Figure 6:
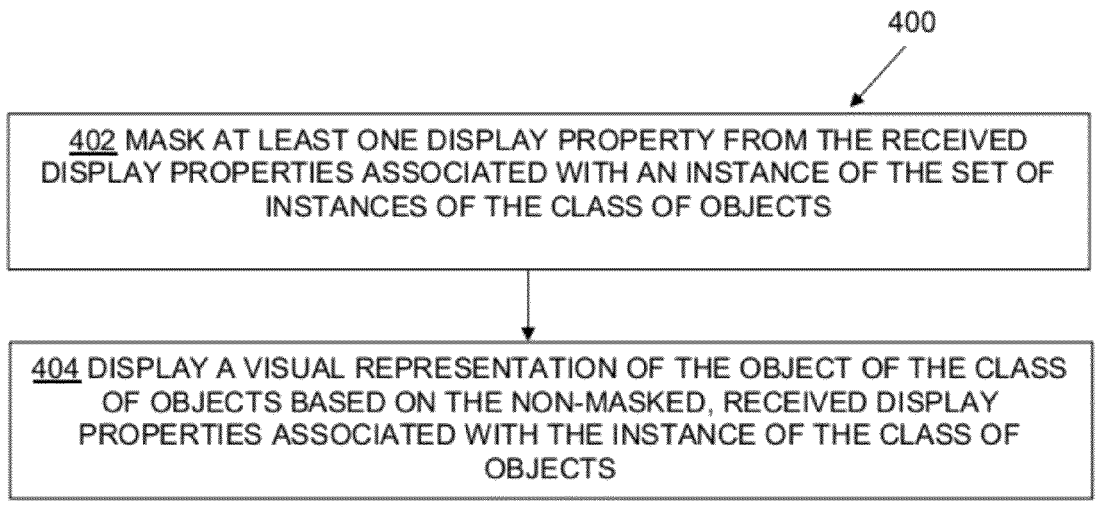
FIG. 6 is a flowchart that illustrates a procedure performed by the client device of FIG. 1.

In one arrangement, the client device 20 is configured to utilize a subset of a set of received display properties 36. For example, FIG. 6 illustrates a method 400 performed by the client device 20 for limiting the display of display properties 36 of an object.

In step 402, the client device 20 masks at least one display property from the received display properties 36 associated with an instance of the set of instances 38 of the class of objects. In one arrangement, with reference to FIG. 1 and with respect to the instance of Disk_1 38-1 of the disk object instances 38, the controller 24 executes the call Get Name_1, the call Get Text_1, and the call Get Icon_1 to retrieve the set of display properties 36 associated with the instance 38-1, such as a localized name of the disk object, a localized text of the disk object, an icon of the disk object, and a tooltip of the disk object. In one arrangement, the controller 24 of the client device 20 includes a masker (e.g., a masking process) 90 configured to mask or remove certain properties of the instance 38-1. For example, the masker 90 can be configured to remove the icon of the instance 38-1 from the set of display properties 36.

Returning to FIG. 6, in step 404, the client device 20 displays a visual representation of the object of the class of objects based on the non-masked display properties associated with the instance of the class of objects. For example, based upon the non-masked display properties 36 associated with instance 38-1, the client device 20 can generate a visual representation of the object associated with the instance 38-1. In such a case, the visual representation of the object can include the localized name of the disk object, the localized text of the disk object, and the tooltip of the disk object but excludes the icon of the disk object. With such a configuration, during operation the masker 90 of the client device 20 is provided to detect, for each instance, the applicable display properties of the set of display properties for each object.

Figure 7:
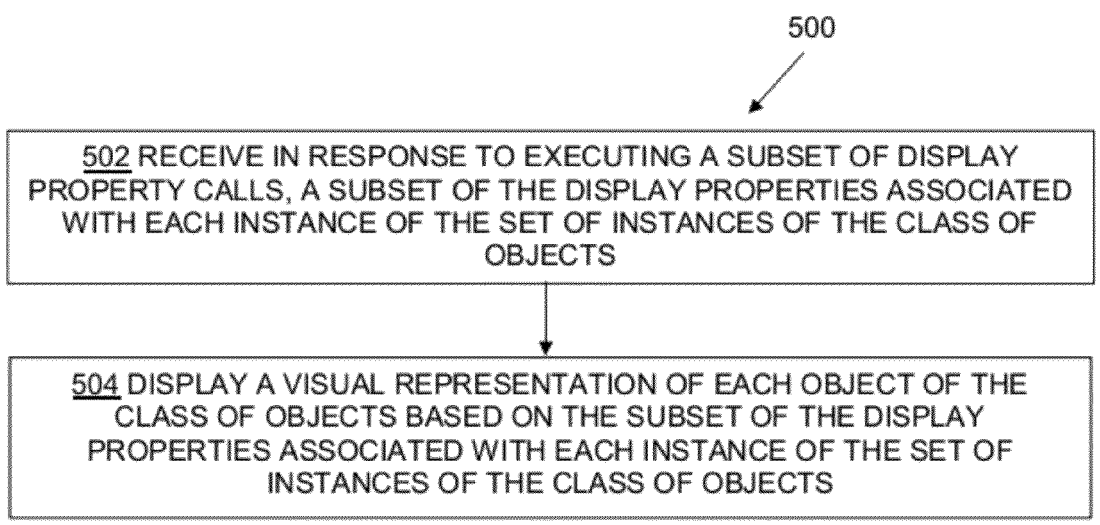
FIG. 7 is a flowchart that illustrates a procedure performed by the client device of FIG. 1.

In one arrangement, the client device is configured to request and cache a subset of a set of display properties 36. For example, FIG. 7 illustrates a method 500 performed by the client device 20 for limiting the display of display properties 36 of an object based upon such caching.

In step 502, the client device 20 receives, in response to executing a subset of display property calls 44, a subset of the display properties associated with each instance of the set of instances of the class of objects. As indicated above, each instance of the set of instances 38 has associated display property calls 44 used by the controller 24 to retrieve display properties 36 for each instance of the set of instances 38. For example, as illustrated in FIG. 1, the instance of Disk_1 38-1 includes the call Get Name_1, the call Get Text_1, and the call Get Icon_1. In one arrangement, the controller is configured to execute a subset of the display property calls 44 to retrieve a subset of display properties 36 associated with an instance. For example, assume the controller 24 is configured to execute the call Get Name_1 and the call Get Text_1 for the instance 38-1.

Returning to FIG. 7, in step 504, the client device 20 displays a visual representation of each object of the class of objects based on the subset of the display properties associated with each instance of the set of instances of the class of objects. For example, in the case where the controller 24 executes the call Get Name_1 and the call Get Text_1 for the instance 38-1, the client device 20 receives only the localized name and the localized text of that instance 38-1 as part of the set of display properties 36. Accordingly, during operation, the client device 20 can provide only the localized name and the localized text and part of the visual representation of the object associated with the instance 38-1. Because the client device 20 does no execute the call Get Icon_1, the client device does not include the icon of the object associated with the instance 38-1 as part of the visual representation.

While various embodiments of the invention have been particularly shown and described, it will be understood by those skilled in the art that various changes in form and details may be made therein without departing from the spirit and scope of the invention as defined by the appended claims.

As described above, object classes implement the interface attribute 34 to provide the client device 20 the ability to display objects of an object class in a variety of ways. Such description is by way of example only. In one arrangement, other classes are configured to implement the interface attribute 34 as well. For example, alert classes (e.g., Alert), scope classes (e.g., Scope), and status classes (e.g., Status) can also be configured to implement the Displayable interface attribute as an interface attribute 34.

As indicated above, in response to the request 30 for a class of disk objects, the client device 20 receives a list of disk objects 32 associated with the data storage environment 10 from the data storage system 22. The list of objects 32 includes the interface attribute 34 (e.g., Displayable) used by the client device 20 to retrieve display properties (e.g., name, text, and icon information) for the listed objects. Such description is by way of example only. In one arrangement, client device 20 is configured to receive a list of objects 32 from an internal storage location, such as a memory associated with the controller. The client device 20 can then utilize the received interface attribute 34 when building and displaying certain section objects 95 associated with a graphical user interface 48, such as illustrated in FIG. 3.

As indicated above, after having built the visual representation of each object for the class of objects, the client device 20 displays the component associated with the visual representations of the class of objects via the display 26. In one arrangement, prior to displaying the components associated with the visual representations of a class of objects, the client device 20 applies an interface attribute 34 to a group of objects to localize the group of objects.

What is claimed is:

1. A method for building an object for display by a client device, comprising:
    transmitting, by the client device, a request to an object storage device for a class of objects;
    receiving, by the client device, a list of objects of the class of objects requested, the list of objects including an interface attribute, the interface attribute configured to direct the client device to a set of display properties for each object of the list of objects; and
    executing, by the client device, the interface attribute to retrieve the set of display properties associated with the display of each object of the class of objects, the set of display properties of each object defining a visual representation of that object by the client device,
    wherein executing the interface attribute to retrieve the set of display properties associated with the display of each object of the class of objects comprises:
        parsing, by the client device, the list of objects of the class of objects to create a set of instances of the class of objects;
        retrieving, by the client device, a set of display property calls for each instance of the set of instances of the class of objects; and
        associating, by the client device, the received set of display property calls with the each corresponding instance of the set of instances of the class of objects, wherein parsing the list of objects of the class of objects to create the set of instances of the class of objects includes:
inputting the list of objects into an extensible markup language parser to generate the set of instances of the class of objects,
wherein the interface attributes included in the list of objects are generated by the client device upon parsing the list of objects.

2. The method of claim 1, wherein executing the interface attribute to retrieve the set of display properties associated with the display of each object of the class of objects further comprises:
executing, by the client device, the set of display property calls for each instance of the set of instances of the class of objects;
receiving, by the client device and in response to executing the set of display property calls, the display properties associated with each instance of the set of instances of the class of objects.

3. The method of claim 2, comprising:
displaying, by the client device, a visual representation of each object of the class of objects based on the received display properties associated with each instance of the set of instances of the class of objects.

4. The method of claim 2, comprising:
receiving, by the client device, a filtering command configured to filter at least one instance of the set of instances of the class of objects; and
displaying, by the client device, a visual representation of each object according to the received filtering command.

5. The method of claim 2, comprising:
receiving, by the client device, a sorting command to sort at least one instance of the set of instances of the class of objects; and
displaying, by the client device, a visual representation of each object according to the received sorting command.

6. The method of claim 2, comprising:
masking, by the client device, at least one display property from the received display properties associated with an instance of the set of instances of the class of objects;
displaying, by the client device, a visual representation of the object of the class of objects based on the non-masked display properties associated with the instance of the class of objects.

7. The method of claim 2, wherein receiving, by the client device and in response to executing the set of display property calls, the display properties associated with each instance of the set of instances of the class of objects comprises receiving, by the client device and in response to executing a subset of display property calls, a subset of the display properties associated with each instance of the set of instances of the class of objects;
displaying, by the client device, a visual representation of each object of the class of objects based on the subset of the display properties associated with each instance of the set of instances of the class of objects.

8. The method of claim 2, wherein receiving the display properties comprises receiving at least one of a localized name of an object, a localized text of an object, an icon of an object, and a tooltip of an object.

9. An apparatus, comprising:
at least one communications interface; and
a controller, including a memory and a processor, electrically coupled to the at least one communications interface wherein the controller is configured to:
transmit a request to an object storage device for a class of objects,
receive a list of objects of the class of objects requested, the list of objects including an interface attribute, the interface attribute configured to direct the client device to a set of display properties for each object of the list of objects, and
execute the interface attribute to retrieve the set of display properties associated with the display of each object of the class of objects, the set of display properties of each object defining a visual representation of that object by the client device,
wherein when executing the interface attribute to retrieve the set of display properties associated with the display of each object of the class of objects, the controller is configured to:
parse the list of objects of the class of objects to create a set of instances of the class of objects;
retrieve a set of display property calls for each instance of the set of instances of the class of objects; and
associate, the received set of display property calls with the each corresponding instance of the set of instances of the class of objects,
wherein when parsing the list of objects of the class of objects to create the set of instances of the class of objects, the controller is configured to:
input the list of objects into an extensible markup language parser to generate the set of instances of the class of objects,
wherein the interface attributes included in the list of objects are generated by the client device upon the parse of the list of objects.

10. The apparatus of claim 9, wherein when executing the interface attribute to retrieve the set of display properties associated with the display of each object of the class of objects, the controller is configured to:
execute the set of display property calls for each instance of the set of instances of the class of objects;
receive, in response to executing the set of display property calls, the display properties associated with each instance of the set of instances of the class of objects.

11. The apparatus of claim 10, wherein the controller is configured to:
display a visual representation of each object of the class of objects based on the received display properties associated with each instance of the set of instances of the class of objects.

12. The apparatus of claim 10, wherein the controller is configured to:
receive a filtering command configured to filter at least one instance of the set of instances of the class of objects; and
display a visual representation of each object according to the received filtering command.

13. The apparatus of claim 10, wherein the controller is configured to:
receive a sorting command to sort at least one instance of the set of instances of the class of objects; and
display a visual representation of each object according to the received sorting command.

14. The apparatus of claim 10, wherein the controller is configured to:
mask at least one display property from the received display properties associated with an instance of the set of instances of the class of objects;
display a visual representation of the object of the class of objects based on the non-masked display properties associated with the instance of the class of objects.

15. The apparatus of claim 10, wherein:

when receiving, in response to executing the set of display property calls, the display properties associated with each instance of the set of instances of the class of objects the controller is configured to receive, in response to executing a subset of display property calls, a subset of the display properties associated with each instance of the set of instances of the class of objects; and wherein the controller is configured to:

display a visual representation of each object of the class of objects based on the subset of the display properties associated with each instance of the set of instances of the class of objects.

16. The apparatus of claim 10, wherein when receiving the display properties, the controller is configured to receive at least one of a localized name of an object, a localized text of an object, an icon of an object, and a tooltip of an object.

17. A computer program product having a non-transitory computer-readable medium including computer program logic encoded thereon that, when performed on a controller of an apparatus causes the apparatus to:

transmit a request to an object storage device for a class of objects, receive a list of objects of the class of objects requested, the list of objects including an interface attribute, the interface attribute configured to direct the client device to a set of display properties for each object of the list of objects, and execute the interface attribute to retrieve the set of display properties associated with the display of each object of the class of objects, the set of display properties of each object defining a visual representation of that object by the client device, wherein the execution of the interface attribute to retrieve the set of display properties associated with the display of each object of the class of objects comprises:

parse the list of objects of the class of objects to create a set of instances of the class of objects;

retrieve a set of display property calls for each instance of the set of instances of the class of objects; and associate the received set of display property calls with the each corresponding instance of the set of instances of the class of objects, wherein the parse of the list of objects of the class of objects to create the set of instances of the class of objects includes:

input the list of objects into an extensible markup language parser to generate the set of instances of the class of objects, wherein the interface attributes included in the list of objects are generated by the client device upon the parse of the list of objects.

* * * * *